Jan. 9, 1962     E. F. WHITE     3,016,257
CARGO LATCH

Filed June 10, 1959     4 Sheets-Sheet 1

INVENTOR.
ERVING F. WHITE
BY
Louis B. Applebaum
ATTORNEY

Jan. 9, 1962 E. F. WHITE 3,016,257
CARGO LATCH

Filed June 10, 1959 4 Sheets-Sheet 2

INVENTOR.
ERVING F. WHITE
BY
Louis B. Applebaum
ATTORNEY

Jan. 9, 1962     E. F. WHITE     3,016,257
CARGO LATCH
Filed June 10, 1959            4 Sheets-Sheet 4
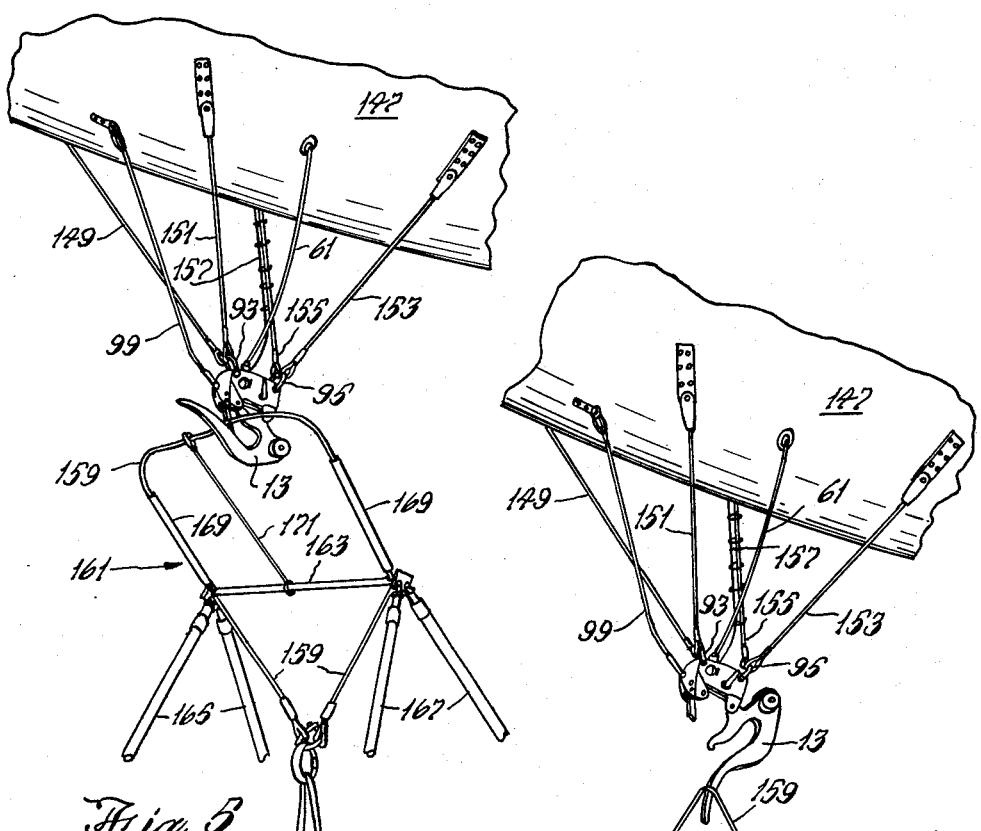
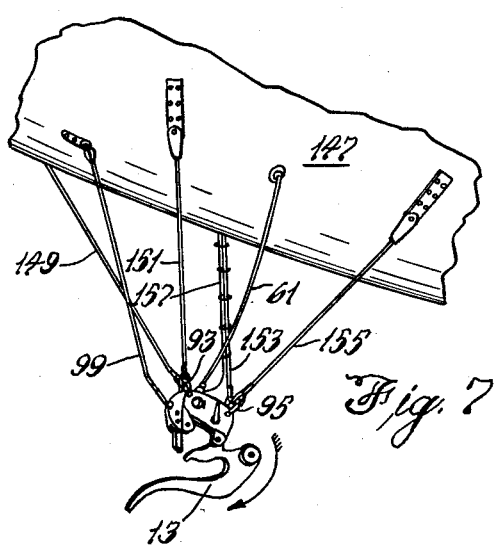
INVENTOR.
ERVING F. WHITE
BY
ATTORNEY

United States Patent Office 3,016,257
Patented Jan. 9, 1962

3,016,257
CARGO LATCH
Erving F. White, 18892 Ervin Lane, Santa Ana, Calif.
Filed June 10, 1959, Ser. No. 819,514
4 Claims. (Cl. 294—83)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in cargo loading systems, and more particularly pertains to cargo loading systems adapted for pickup and transport external an airborne vehicle such as a helicopter, and for delivery from such a vehicle.

The extreme danger to personnel inherent in conventional helicopter external cargo hook-up systems has been a major problem. The possibilities of engine failure, of loss of control, or of pilot error allowing the helicopter to settle on the personnel engaged in the hook-up, with resultant serious or fatal injuries, present grave problems. These problems are further aggravated by the violence of the blast from the helicopter rotor down wash causing injuries from blowing sand, gravel and other loose debris. These hazards, including the danger potential of the ungrounded static electrical field of the helicopter, are increasingly serious as larger types of cargo carrying helicopters are introduced. To meet these problems, the cargo hook system of the present invention was developed.

The invention is embodied in a cargo hook or load-latching means and a control system therefor. It is adapted to supplant conventional external cargo hooks and to thereby speed hook-up and delivery operations when used in a semi-automatic manner, and to reduce to a great degree the danger to ground personnel participating in external hook-up operations when used in a semi-automatic manner. Further, when used in the automatic manner, it eliminates the need for ground personnel to attach the load to the cargo hook, virtually eliminating danger to the ground personnel. These ends, and the expected consequent ends, are accomplished by providing a housing adapted to be suspended below a helicopter or other craft, with means for mechanical and electrical couplings therebetween, a cargo hook carried dependingly by said housing, and means operable from the carrying craft to snatch a load, to secure the load, to release the load, and to reset the cargo hook for a second pickup, so that a multiplicity of repetitive cargo handling operations is permitted. The system employed further comprises complementary ground gear consisting of bridles, supporting poles and guide means adapted to facilitate semi-automatic or automatic coupling of the cargo hook and the load.

Other objects and many of the attendant advantages of this invention will be readily appreciated as the same becomes better understood by reference to the following detailed description when considered in connection with the accompanying drawings wherein:

FIG. 4 is a circuit diagram of the cargo latch actuating and control means; and

FIGS. 5, 6 and 7 are fragmentary perspective views of a cargo latch in stages of use for picking up, carrying and discharging a load external a helicopter.

Similar numerals refer to similar parts throughout the several views.

Figure 1:
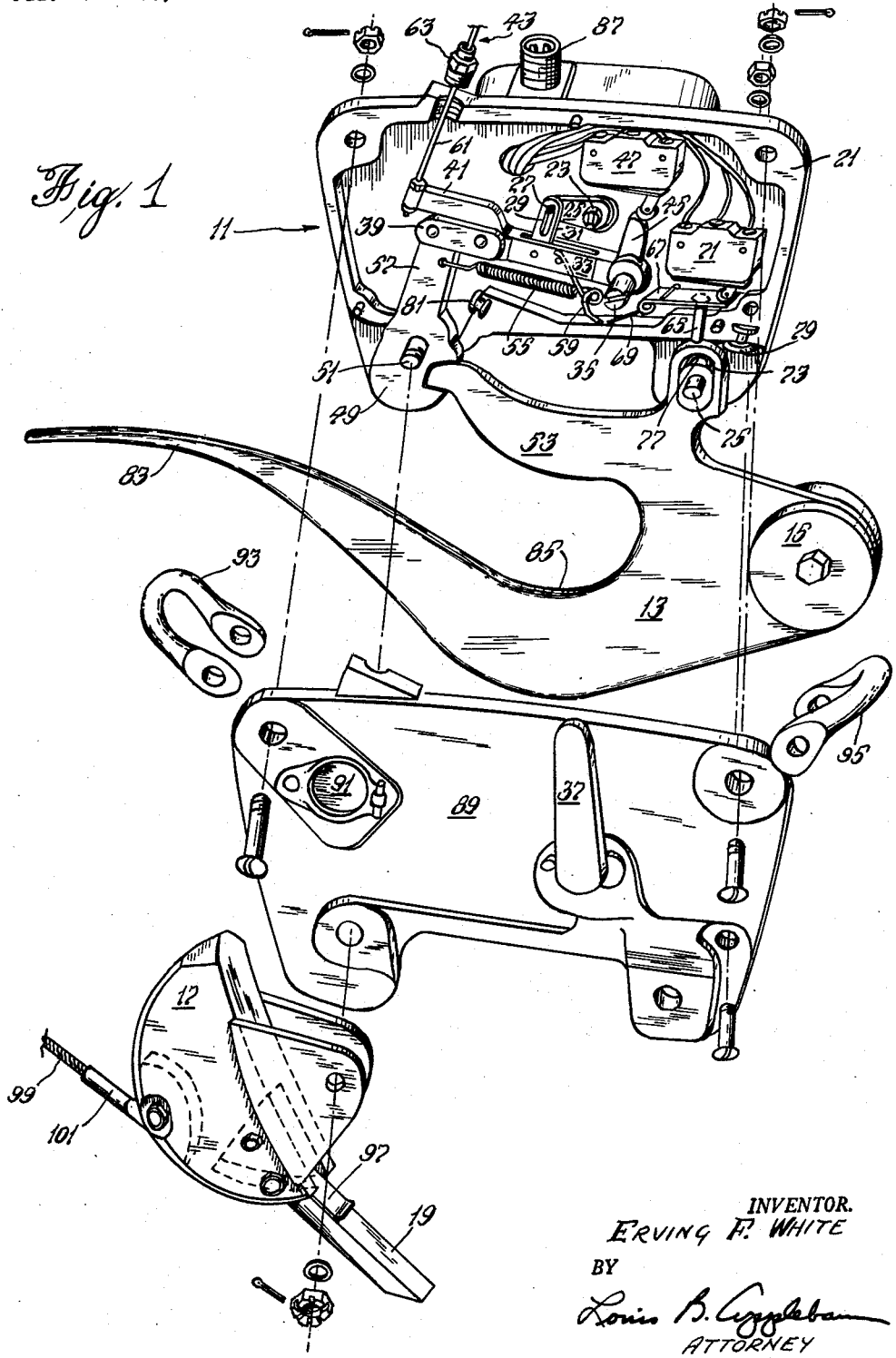
FIG. 1 is an exploded perspective view of a cargo hook, showing a preferred embodiment of the invention.

As shown in FIG. 1, the cargo latch comprises a housing 11 adapted to carry the actuating mechanism, a latch 13 carrying a counter-balance, or biasing weight, 15 and depending rotatably from said housing, and a counter-balance, or counterweight, 17 secured to said housing and carrying a throat latch 19 for said latch.

Figure 2:
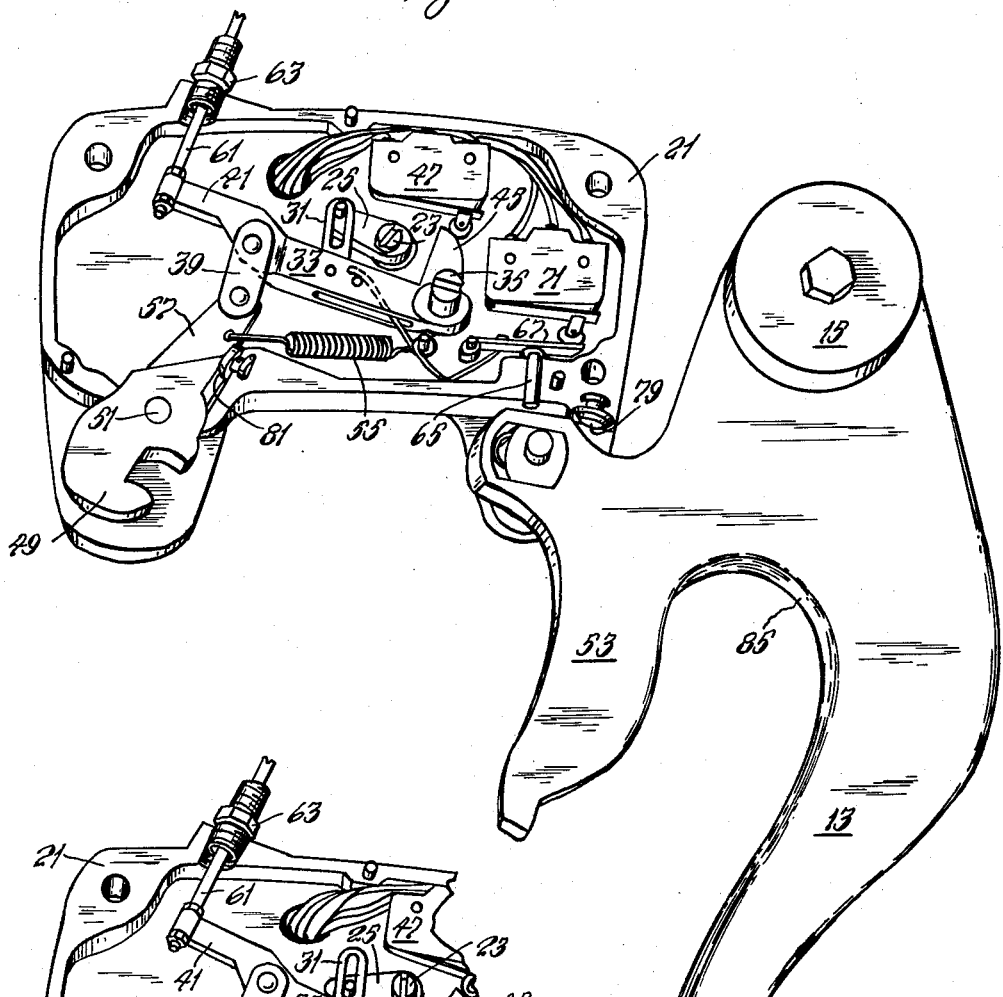
FIG. 2 is a fragmentary perspective view of a cargo hook, with the cover plate removed, showing the latch and its actuating linkages in load-discharging position.
Figure 3:
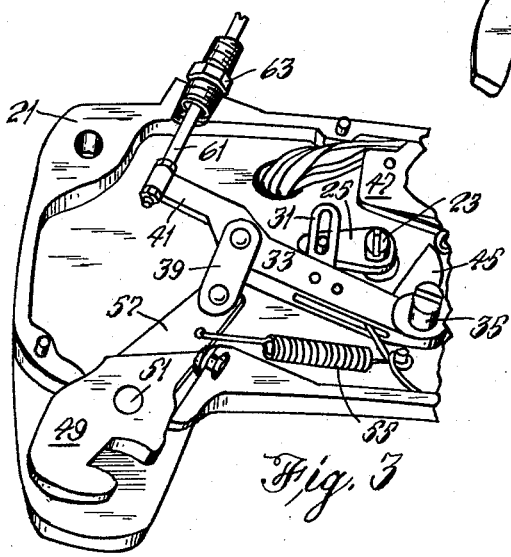
FIG. 3 is a fragmentary perspective view of a cargo latch, showing the operation of a manual latch-actuating means thereof.
Figure 2:
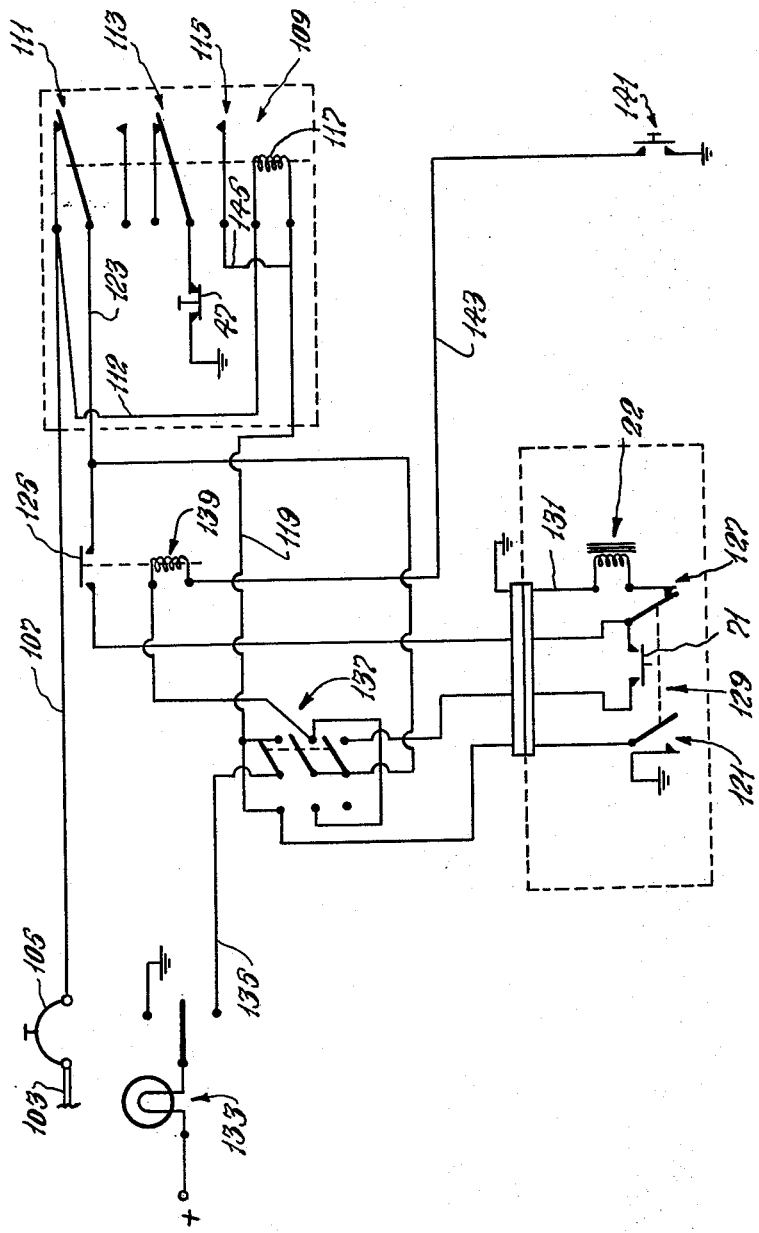

The case 21 of housing 11 carries a main solenoid 22 (shown in FIG. 4 only) that is adapted, when energized, to rotate shaft 23. The arm 25 is secured to shaft 23, and is provided with a pin 27 riding in slot 29 of arm 31 to move said arm 31. The lever 33 is connected to said arm 31 for translation thereby, said lever 33 having a member 35 at one end adapted to carry a hand lever 37, a toggle linkage 39 secured rotatably to the other end, and an arm 41 extending from said other end for coupling to the manual release means 43 hereinafter described. Said lever is further provided with an arm 45 adapted to close the contacts of arming switch 47. The toggle linkage is also secured rotatably to the dog member 49, which is adapted to rotate on the axis of its pin 51 for engagement of the arm 53 of latch 13, as shown in FIG. 1, or for disengagement as shown in FIGS. 2 and 3. Coil spring 55 is under tension between the arm 57 of dog member 49 and a post on casing 21. Leaf spring 59 maintains lever 33 in the position shown in FIG. 1 until countered by the force of the main solenoid.

The manual release means 43 comprises a cable 61 secured to the end of arm 41 and extending upward out of the casing through adapter 63 to an operator's position in the craft above, not shown. Touchdown release means comprises a pin 65 seated in the floor of the housing 11 and adapted to be moved upward by the latch 13, as hereinafter described. Said pin 65 bears against arm 67, which is retained against pin 65 by spring 69 and which is adapted to close the contacts of touchdown microswitch 71.

The latch 13 is provided with a pivot slot 73 for rotatable and slidable seating of the latch on the pivot pin 75. Further, a spring 77 is seated between the pivot pin 75 and the inner face of slot 73. Thus, under normal load of a predetermined minimum, the spring 77 is under maximum compression and the pin 65 is in lowermost position. When a load less than the predetermined minimum is carried, as at the time of touchdown of a load, the spring 77 drives the latch upward, pushing pin 65 to close the contacts of touchdown microswitch 71, as shown in FIG. 1. A bumper 79 is adapted to limit rotation of latch 13, and a bumper 81 is adapted to limit rotation of dog member 49.

The latch is further provided with an elongate tongue 83 that forms, with arm 53, a throat portion 85 adapted to receive and to hold a load cable. The latch is so proportioned that the center of gravity of the latch, when the latch is in the position shown in FIG. 1, is proximate weight 15. Thus, the weight of the latch tends to drive it to the position shown in FIG. 1, and to hold it in such position—positive mechanical force is required to move the latch to the position shown in FIG. 2.

Further describing the latch shown in FIG. 1, it can be seen that electrical connections to the microswitches 47 and 71 are made through junction member 87, and that the cover plate 89, which includes an access door 91, is secured to the case 21 by suitable bolts, washers, nuts and pins, as shown. Shackles 93 and 95 are secured to the housing, fore and aft. Counterbalance 17 is secured upon the housing 11 to provide an inertia mass limiting rotation of the housing as the latch rotates towards the position shown in FIG. 1. Said counter-balance 17 carries, dependingly, a throat latch 19 that is retained yieldingly against rotation from the position shown in FIG. 5 by leaf spring 97. Lead-in cable 99 having collar 101 is secured at one end to counter-balance 17 for use as hereinafter described.

FIG. 2 shows the position of the actuating elements of the latch when the main solenoid has been employed to release a load. The arm 25, through arm 31, lever 33 and toggle 39, has rotated dog member 49, to permit the weight of the load to rotate latch 13 away from engagement of arm 53 by said dog 49. In generally similar fashion, the linkage above described and the cable 61 permits remote manual operation, as shown in FIG. 3: Through a suitable linkage (not shown), the operator in a craft to which the latch is attached dependingly has depressed a foot pedal to move cable 61 upward, to thereby rotate the toggle 39 and permit spring 55 to rotate dog 49 and allow disengagement of the arm 53 of latch 13 from such dog.

The operation of the latch can be further understood by consideration of the circuit diagram of FIG. 4: The primary bus 103 feeds through fuse 105 and conductor 107 to double pole double throw relay 109, which is provided with normally closed contacts 111 and 113, and with normally open contact 115; the conductor 107 is connected to a terminal of contacts 111 and by means of leg 112 to the coil 117 which actuates relay 109, with the other side of said coil 117 being connected to ground through conductor 119 in which is provided normally open contacts 121. Arming switch 47 is connected between a terminal of contacts 113 and ground.

The main solenoid 22 is energized through conductor 107, contacts 111 and conductor 123, which is connected to said solenoid through normally open switch 125 and contacts 127 of double throw switch 129, the arm of contacts 127 and the arm of contacts 121 being ganged and of the make, then break, class whereby contacts 121 close before contacts 127 open. The path to ground from solenoid 22 is through conductor 131.

The circuit further comprises a current source fed through a "press to test" warning light 133 and conductor 135. Triple-pole switch 137 is of the double throw type, and is shown in open position. In a first closed position, the contacts of switch 137 energize coil 117 and coil 139, and permit touch down switch 71 to actuate the solenoid 22. In a second closed position, the operation is the same except that the touch down switch 71 cannot be included in the circuit.

The normally open pilot's thumb switch 141 is carried between ground and a terminal of coil 139 by conductor 143.

By means of the structure and circuit above described, it can be seen that the hook is opened electrically by means of the cargo release switches, which can be mounted on the pilot's or co-pilot's cyclic stick grips. The hook can also be opened automatically on touch-down of the load by means of switch 71, which is of the snap-switch type. The pilot can release the load manually by depressing the manual foot release plunger on the cockpit deck to pull cable 61. In addition to the above, an electrical switch 125 is provided for the crew chief located in the cabin of the craft, which may be a vantage point for controlling operation.

Positive latching action of the hook after each cargo drop is provided by the electrical relay and arming switch 47 that is provided. When the cargo release switch 141 is closed by the pilot, dog 49 is rotated and the cargo hook latch opens, dropping the load; the relay then breaks the circuit. The circuit remains open, rendering the system inoperative, until the arming switch is closed. This is particularly important when using the automatic touch-down release—if the circuit were allowed to close after the load was dropped, the hook latch could never be closed and the hook would remain open. This relay and arming switch are wired to the cargo warning light through conductor 145. The light is illuminated when the hook is actuated open, and the light remains on until the arming switch 47 is depressed. When the light goes out, the circuit is rearmed and ready for the next pick-up.

A sequence of operations is shown in FIGS. 5, 6 and 7. The cargo latch is suspended from the fuselage of a craft such as a helicopter 147 by cables 149, 151, 153 and 155, which are attached to shackles 93 and 95, as shown. Electrical leads are brought down to housing 11 through cables 157. Cable 61 is the manual operating means, and lead-in cable 99 is provided. Thus, as shown in FIG. 5, the latch 13 is in closed position, and engages the cable 159 of bridle 161. Spreader bar 163 spaces support poles 165 and 167, and tubing 169 with wire 171 maintain an erect loop of cable 159. The load 173 is secured to cable 159, and the pins 175 and 177 are seated in the ends of poles 165 and 167 respectively, so that the poles fall away as the load is lifted.

FIG. 6 shows a load being released, and FIG. 7 shows the latch in the process of rotation back to the position for engaging and carrying the bridle of another load.

Obviously many modifications and variations of the present invention are possible in the light of the above teachings. It is therefore to be understood that within the scope of the appended claims the invention may be practiced otherwise than as specifically described.

I claim:

1. In a cargo latch comprising a housing, a latch member having a throat formed by a tongue and an arm pivotably attached at one end to said housing, said latch member being pivotable to an open or a closed position, a dog member movably affixed to said housing, said latch member in its closed position being engaged and retained by said dog member, movement of said dog member permitting said latch member to pivot to its open position under the actuation of weight applied to said tongue, and a throat latch mounted on said housing and extending therefrom across the open portion of the throat of said latch member, a biasing weight mounted on said latch member to bias said latch member into a normally closed position, and a counterweight affixed to said housing for retarding movements of said housing in response to the dynamic thrust resulting from movement of said latch member to its closed position.

2. An automatic cargo loading and release apparatus comprising, in combination: a latching device comprising a housing, a latch member having a throat formed by a tongue and an arm pivotably attached at one end to said housing, said latch member being pivotable to an open or a closed position, a dog member movably affixed to said housing, said latch member in its closed position being engaged and retained by said dog member, movement of said dog member permitting said latch member to pivot to its open position under the actuation of weight applied to said tongue, a throat latch mounted on said housing and extending therefrom across the open portion of the throat of said latch member, a biasing weight mounted on said latch member to bias said hook member into a normally closed position, and a counterweight affixed to said housing for retarding movements of said housing in response to the dynamic thrust resulting from movement of said latch member to its closed position; and an electrical circuit comprising a release solenoid mechanically coupled with said dog member, actuation of said release solenoid moving said dog member permitting said latch member to pivot to its open position under the influence of a load, a first switch in circuit with said release solenoid, closure of said first switch actuating said release solenoid, and an arming switch and circuit-breaking relay in circuit with said release solenoid, acutation of said first switch also actuating said circuit-breaking relay to prevent application of energy to all other components of said electrical circuit except said circuit-breaking relay until said arming switch is operated.

3. An automatic cargo loading and release apparatus comprising in combination: a latching device comprising a housing, a latch member having a throat formed by a tongue and an arm pivotably attached at one end to said housing, said latch member being pivotable to an open or a closed position, a dog member movably affixed to said housing, said latch member in its closed position being engaged and retained by said dog member, movement of said dog member permitting said latch member to pivot to its open position under the actuation of weight applied to said tongue, a throat latch mounted on said housing and extending therefrom across the open portion of the throat of said latch member, a biasing weight mounted on said hook member to bias said latch member into a normally closed position, and a counterweight affixed to said housing for retarding movements of said housing in response to the dynamic thrust resulting from movement of said latch member to its closed position; and an electrical circuit comprising a release solenoid mechanically coupled with said dog member, actuation of said release solenoid moving said dog member permitting said latch member to pivot to its open position under influence of a load, a touchdown switch in circuit with said solenoid, said touchdown switch mounted for closure when a load being carried by said release apparatus is deposited on a weight-bearing surface, closure of said switch actuating said release solenoid, and an arming switch and circuit-breaking relay in circuit with said release solenoid, actuation of said touchdown switch also actuating said circuit-breaking relay to prevent application of energy to all other components of said electrical circuit except said circuit-breaking relay until said arming switch is operated.

4. An apparatus as set forth in claim 3, including an additional switch in circuit with said release solenoid and effectively in parallel with said touchdown switch, whereby energy may be manually applied to said release solenoid to actuate it.

References Cited in the file of this patent

UNITED STATES PATENTS

| | | |
|---|---|---|
| 1,778,484 | DaCosta | Oct. 14, 1930 |
| 1,869,506 | Richardson | Aug. 2, 1932 |
| 1,994,782 | Olson | Mar. 19, 1935 |
| 2,551,596 | Haglund | May 8, 1951 |
| 2,832,635 | Furnia | Apr. 29, 1958 |
| 2,879,016 | Haase | Mar. 24, 1959 |
| 2,904,369 | Campbell | Sept. 15, 1959 |